United States Patent [19]
Montgomery et al.

[11] Patent Number: 5,315,641
[45] Date of Patent: May 24, 1994

[54] PUBLIC SWITCHED TELEPHONE NETWORK ACCESS TO PUBLIC DATA NETWORK

[75] Inventors: Robert H. Montgomery, Herndon, Va.; Lawrence A. Delss, Baltimore, Md.

[73] Assignee: Bell Atlantic Network Services, Inc., Arlington, Va.

[21] Appl. No.: 959,920

[22] Filed: Oct. 14, 1992

[51] Int. Cl.$^5$ .......................................... H04M 11/00
[52] U.S. Cl. ........................................ 379/94; 379/93; 379/98; 379/220
[58] Field of Search ............... 379/91, 93, 94, 95, 379/114, 115, 127, 220, 98

[56] References Cited

U.S. PATENT DOCUMENTS

| | | | |
|---|---|---|---|
| 4,219,200 | 9/1981 | Smith | 379/94 |
| 4,796,292 | 1/1989 | Thomas | 379/91 |
| 5,113,430 | 5/1992 | Richardson et al. | 379/94 |
| 5,163,086 | 11/1992 | Shearn et al. | 379/91 |
| 5,163,087 | 11/1992 | Kaplan | 379/142 |

*Primary Examiner*—Jin F. Ng
*Assistant Examiner*—Daniel J. Wu
*Attorney, Agent, or Firm*—Lowe, Price, LeBlanc & Becker

[57] ABSTRACT

A system and method for providing Feature Group B or Feature Group D access to the public data network for effecting point of sale transactions such as credit card authorization. The credit card authorization device includes a modem and auto-dialing mechanism which is connected by a station line to an originating central office switch. The originating central office switch is connected via Feature Group B or Feature Group D trunks to a designated destination central office including a stored program control (SPC) switch. The destination central office is a functioning central office connected to other central offices by non-Feature Group trunks. The Feature Group trunks are connected by the switch in the destination central office to a designated line which is connected to a line side modem which is connected via the public data network to a host computer for effecting the credit card authorization. The SPC switch at the destination central office converts the Feature Group number on the Feature Group trunk to a line side number for the station containing the line side modem. Common channel signaling and quick start or ground start are preferably utilized to optimize speed.

23 Claims, 5 Drawing Sheets

PUBLIC SWITCHED TELEPHONE NETWORK ACCESS TO PUBLIC DATA NETWORK

TECHNICAL FIELD

This invention relates generally to the use of the public switched telephone network for the transmission of data and more particularly to using the public switched telephone network to access the public data network.

BACKGROUND ART

The evolution of the handling of credit card authorization transactions over the public switched telephone network is described in some detail in U.S. Pat. No. 4,796,292 issued Jan. 3, 1989, to Jerry S. Thomas and assigned to American Express Company of N.Y. A familiarity with the evolution of the public switched telephone network in the United States at the present date is helpful to an understanding of the present invention. The following background description summarizes portions of that discussion in conjunction with FIGS. 1, 2 and 3 which appeared in said U.S. Pat. No. 4,796,292.

The public switched telephone network (PSTN) as it existed before the Bell System break-up, is shown in grossly simplified form in FIG. 1. Each central office 10 provided service over telephone lines 14 to telephone stations 12. Central offices were connected to each other by trunks 16. Trunks are distinguished from telephone lines by the use of heavy lines. Each central office included a switch 8 for effecting connections between lines and lines, and lines and trunks. (Other switching facilities including tandem switches were provided for effecting trunk-trunk interconnections.) In general, a trunk is a 5 communication path in a network which connects two switching systems and tandem switches switch trunk to trunk. A trunk circuit, associated with the connection of a trunk to a switching system, serves to convert between the signal formats used internally in the switching system and those used in the transmission circuit, and it performs logic and sometimes memory functions associated with supervision. A line, on the other hand, is a pair of wires carrying direct current and analog communication signals between a central office and a customer's terminal; a line-side connection is a connection of central of f ice equipment to a line.

As the PSTN grew numerous interfaces and protocols developed and became standard. An interface is a shared boundary defined by common physical interconnection characteristics, signal characteristics, and meanings of interchanged signals. In telephony, the term "signaling" means the transmission of information to establish, monitor, or release connections and provide network control. Lines interfaced to central offices in ways which were distinct from those in which trunks interfaced to central offices. The physical connections were different, and even the number of wires could be different. The signalings were different. A protocol consists of procedures for communication between a sender and a receiver, of supervisory and address information, in order to establish and maintain a communications path. It is an agreed-to set of procedures so that communications between two ends will be intelligible in both directions (transmit and receive).

As time passed and AT&T faced competition from other common carriers (OCCs), the PSTN developed as shown, once again grossly simplified, in FIG. 2. Bell System central offices were still connected by trunks 16 to other central of f ices. An OCC such as MCI or Sprint would provide switches 18 which could be accessed from central office lines. The OCC switches would be interconnected via their own network trunks 24. In order to gain access to a common carrier other than AT&T, a telephone subscriber would be connected over a telephone line to his central office, through his central office and perhaps others, and finally over another telephone line associated with the OCC.

The quality of communications was generally not as good when going through the facilities of an OCC. This was the case even though the trunks actually used by the OCCs were leased from AT&T. The reason was related to the fact that poor performance is attributable most often to the inferior transmission performance on line-side connections. A typical AT&T Bell System call involved two lines 14, one at each end of the overall communication path; all other interfaces along the way involved trunk connections. An OCC, on the other hand, had an additional two line interface, as shown by numerals 20 and 22 in FIG. 2. Because each central office was connected over lines, not trunks, to an OCC switch, there were four line segments in each call, not just two.

In order that the common carriers other than AT&T be able to provide the same superior service following break-up of the Bell System, and in order that equal access to the local exchange users be given to all long distance Interstate Carriers, several access arrangements were made available. These access arrangements are known as Switched Access Services. The term Interexchange Customer or Carrier (IC) is used to denote any subscriber of Switched Access Services, including an Interexchange Carrier.

The geographic areas served by the Bell Operating Companies have been divided into Local Access and Transport Areas (LATAs). A typical LATA is shown in FIG. 3. A LATA is an area within which a Bell Operating Company—an Exchange Carrier (EC) or Local Exchange Carrier (LEC)—may offer telecommunication services. Interchange carriers (ICs) provide services between LATAS. The Interexchange Carriers are, AT&T, MCI, Sprint and others. The specific switched access arrangements offered by the Bell Operating Companies are known as the Feature Groups. An End Office (EO) is a Bell Operating Company switching system within a LATA where customer station loops (lines) are terminated for purposes of interconnection to each other and to trunks; a call may go directly from an End Office or be tandemed through a second office known as an Access Tandem (AT) to reach the IC. A tandem is a switching system in the message network that establishes trunk-to-trunk connections. As shown in FIG. 3, telecommunications within a LATA are handled by an EC, whereas telecommunications from one LATA to another are handled by an IC.

An IC under the present scheme designates a location within a LATA for the connection of its facilities with those of the Bell Operating Company which serves that LATA. There are about two hundred LATAs in the United States, and each of the Bell Operating Companies serves all or portions of multiple LATAs. The location of interconnection designated by the IC is called a Point Of Presence (POP), and typically it is at a building that houses an IC's switching system or facility node. An IC may have more than one POP within a LATA. In FIG. 3 a POP is shown by the numeral 30. An aggregate of one or more IC trunks is shown by the numeral 32. Instead of the POP being connected to a single central office, what usually happens is that it is connected by trunks to an Access Tandem (AT). The AT, shown by the numeral 26 in FIG. 3, is in turn connected to multiple central offices by means of trunks. An Access Tandem is a Bell Operating Company switching system that provides a traffic concentration and distribution function for inter-LATA traffic originating/terminating within a LATA. The AT thus provides the IC with access to more than one End office within the LATA. (A central office is an End Office).

For present purposes, what is important is that the LEC offers the IC a choice of four switched access arrangements called Feature Groups. Each IC, based on its own technical needs and business considerations, selects the access arrangement that it desires. The access arrangement involves a multiplicity of interfaces represented in FIG. 3 by the single trunk 28, it being understood that the drawing is only symbolic and there are in fact as many connections as there are maximum number of simultaneous calls that the IC expects to handle.

Feature Group A is a two-wire line-side connection between the IC and the EC. Feature Group A is not of particular interest because it is a line-side connection and is the only one of the four access arrangements for which the calling party is billed any local tariffed charges, i.e., message units. The other three Feature Groups involve trunk-side connections.

Feature Group B has an associated universal 7-digit (950-0/1XXX) access code and is used for the purpose of originating or terminating calls to or from subscribers. The XXX code is unique to each IC and, most importantly, it is the same throughout the country in all LATAs in which the IC has a presence. Feature Group B access arrangements include trunk signaling, trunk protocols, trunk transmission and trunk testing, and they provide answer and disconnect supervision. There can be two-wire and four-wire trunk terminating equipment, and, in general, there are supplemental features (as there are in the other Feature Groups) which are offered that allow an IC to specify substitutions for, or additions to, the standard arrangements as defined by the appropriate tariff.

Feature Group C exists now but is transitional. AT&T, whose trunk-side connections are presently Feature Group C, will convert to Feature Group D as it becomes available. Feature Group B involves 2-stage dialing, the kind of arrangement which existed before subscribers could select an IC other than AT&T. With an arrangement such as that shown in FIG. 2, a first number is dialed in order to gain access to a line which is connected to the OCC facility, after a connection is established, a second series of numbers are dialed to tell the OCC the personal identification number of the caller (PIN) and the destination of the call. As an option, when the connection is established, Automatic Number Identification (ANI) information may be forwarded to the OCC. Feature Group D, on the other hand, provides true "Equal Access" in that a customer can presubscribe to the long-distance carrier of his choice. By dialing the digit 1, his call will be connected to a Feature Group D trunk at the selected ICs Point Of Presence. There is only one number dialed, that of the destination. While the invention is applicable to Feature Group D service, the illustrative embodiment of the invention is described in terms of Feature Group B service.

Once a caller gains access to an ICs facilities, any subsequent dialing procedures are as specified by the IC for Feature Group A and Feature Group B service. Industry standards exist for the dialing plans for Feature Groups C and D. In-band tone dialing is usually employed, but in any event the EC is transparent to address signaling and data communications between the subscriber and the IC. As far as the interface between the EC and the IC is concerned, the IC can specify the type of supervisory signaling and interface to be used between the Bell Operating Company access facilities and the IC facilities at the ICs point of presence. The signaling options and interfaces that are available vary with the particular feature Group and tariff.

A prior art credit card authorization scheme is shown in FIG. 4. A credit card authorization terminal 30 is connected via an ordinary telephone line 34 to a central office 10. The authorization terminal includes a standard modem 32. At the beginning of the authorization process, the terminal dials a number which is associated with a line connected to a particular Value Added Network (VAN). The connection is established through central office 10. In the VAN 40, line 36 is connected to modem 38. Using the Visa protocol, the two modems communicate with each other. Modem 38 is connected via a digital interface to a Packet Assembler/Disassembler (PAD) 42 or some other multiplexer or concentrator within the VAN. The PAD establishes communication with a host over leased line 44 or some other communication channel.

As described above, the service establishment pays for a local call to the VAN. The VAN charges the credit card company for handling the call. There is no way to reduce the charges paid by the service establishment because a local call through the central office is being placed. It is also apparent that depending upon the location of the VAN in a particular city, the authorization terminals must have different numbers preprogrammed in their automatic dialers.

What is shown in FIG. 5 is a way that a service establishment can be relieved of paying for a local call. Also, the scheme of FIG. 5 must be employed when there is no VAN presence near the credit card authorization terminal. In this case the terminal establishes a call through the dial network 46, and over line 34 and trunk 48 to an AT&T facility 50. The AT&T lines are extended as an 800 call to modems in VAN 40. In this case the service establishment does not pay for the call; AT&T pays the Bell Operating Company. The credit card company picks up all charges of AT&T and the VAN. The arrangement of FIG. 5 is not preferred because of the cost of an 800 call.

The arrangement of FIG. 6 is not known to exist or to have existed but has been hypothecated in the said U.S. Pat. No. 4,796,292 as a kind of system which might be devised by a "telephone man". Lines 14 are connected to authorization terminals and are within the LATA of the Exchange Carrier. Some of the EC trunks, Feature Group B or D, are extended to the Point of Presence of an IC. A switch 54 is provided for extending trunks 28 to their destinations, in this case lines connected to modems and a PAD. Communications originate in the terminal, and a terminating modem in the POP is required to communicate with the modem in the terminal. Modems interface with lines, not trunks. A switch is the standard mechanism for interconnecting lines and trunks. Since only trunks come into the POP, a switch is necessary to connect an incoming trunk to a modem line (just as the switch of a central office connects a trunk and a subscriber line).

This approach allows a terminal to be connected to the host. The service establishment need not be billed for the call because with Feature Group B or D service, the IC pays the EC for each call which is placed. The IC is the only source of billing to the calling party, and with switching equipment having sufficient intelligence, it would be possible for the IC to bill the credit card company for calls placed to its host installation. This FIG. 6 arrangement is stated to be not feasible, however, because of the cost of switch 54. A typical modem is stated to cost in the order of $500. A switch for 100 lines is stated to cost in the order of $200,000. That would make the cost per modem not $500, but $2,500. That is stated to be impractical. And it is further stated there is no apparent way to avoid the use of the switch. There is a modem in each authorization terminal. There must be a modem at the other end of the connection. Modems have line connections. The EC/IC interface is over a Feature group B or D trunk. There is no way that a trunk can be interfaced with a conventional modem. Not only may the number of wires in the trunk be different from the number of wires at the modem input, but the signaling requirements are totally different. A costly switch is stated to be the device which allows a modem line to be connected to a trunk in the hypothecated solution of FIG. 6.

In U.S. Pat. No. 4,796,292 there is proposed an arrangement for authorizing credit card transactions wherein the credit card company obtains a 3-digit Customer Identification Code (CIC) in the manner of an Interexchange Customer or Carrier. At its POP there are provided dedicated, modems and a PAD or: other multiplexer or concentrator which is connected to the host. However, the modems are not conventional modems but are specially designed to provide a trunk-side interface. In the illustrated embodiment in that patent, E & M signaling and T1 interfaces are used. These trunk-side interface modems are stated to be only slightly more expensive than conventional modems. The proffered advantage is a reduction of the cost associated with local telephone calls involved in the transaction.

In the hardware embodiment of this proposal the Local Exchange Carrier (LEC) provides Feature Group B service on T1 access facilities using conventional E & M trunk protocol. The T1 link is connected to a conventional 24channel channel bank that includes a T1 trunk hardware interface. As stated the modem is designed to execute a trunk protocol so that at the two ends of the transmission path, namely the LEC and the modem, a trunk protocol is executed. In view of the fact that the modem is provided with a ground start interface the E & M channel bank cards must be modified to provide a ground start interface for the modem. An arrangement to effectuate this proposal is illustrated in FIG. 7 which comprises a combination of FIGS. 3 and 7B from U.S. Pat. No. No. 4,796,292. The channel bank is connected to the Access Tandem where the LEC establishes a trunk connection. The Access Tandem exercises a trunk protocol.

SUMMARY OF THE INVENTION

According to the present invention it has been found that it is possible to provide an improved point of sale or credit card authorization service without the need for extra switching or specially designed modems. In that arrangement an existing LEC End Office is selected as the designated EO where the Feature Group B or Feature Group D trunk terminates. The point of sale device dials a Customer Identification Code (CIC) such as 950-1/0XXX or 7/10 digit dialing address that provides access to the designated end office. According to this invention the software at that end of f ice then effects address digit manipulation and/or special digit interpretation to convert the incoming address to a unique local address on the line side. The EO switch has the ability to delete digits or prefix new digits that conform to the line number(s) where one or more conventional modems are connected. This feature is typically called code conversion and is an available feature in existing end office switches. The end office switch also can perform special digit interpretation and routing for dedicated trunk groups. A pool of modems may be located at the designated end office and connected to the line side of the switch by a line hunting group. The code converting process substitutes the telephone number of the line hunting group (NXX-XXXX) for the 950-1/0XXX CIC number that it received. The special digit interpretation process directs the call via a dedicated routing table that selects the unique end office line hunting group. The end office thus connects the incoming trunk to an available line circuit within the line hunt group wherein each line is equipped with a conventional modem. Each modem is directly connected to the Packet Data Network (PDN) and the modem and PDN respond to the signals and information generated by the point of sale terminal by passing the call information to or from the host computer. When the host and the point of sale terminal are finished exchanging information, both ends disconnect and all connections are restored to the idle state. It is a feature of the invention that the end office is preferably established in a Common Channel Signaling (CCS) environment ordinarily using Signaling System 7 (SS7). This permits faster connection to the designated end office. Instantaneous signaling to activate the modem is applied at the line in the form of immediate ringing or ground start.

It is accordingly an object of the present invention to provide an improved point of sale credit card authorization service which utilizes currently available equipment so as to provide fast, efficient and effective service in a economical manner.

It is another object of the invention to provide an improved point of sale terminal device service within the context of the existing Public Switched Telephone Network without requiring specially designed equipment for interfacing with the Packet Data Network (PDN).

It is another object of the invention to provide an improved business point of sale terminal device service within the context of the existing public switched telephone network using an existing end office and its switch as the designated end of f ice where the Stored Program Control (SPC) switch is arranged to effect a code converting process or special digit interpretation process to convert an incoming CIC dialed by the point of sale terminal device to a line side address for conventional modems connecting to the Packet Data Network and host computer.

It is another object of the invention to provide an improved business point of sale terminal device service in the context of the current public switched telephone network using common channel signaling and immediate ringing features to optimize the speed of operation.

It is another object of the invention to provide an improved business point of sale terminal device within the context of the existing public switched telephone network using available Feature Group B or Feature Group D technology while obviating any requirement for modem equipment having a trunk side interface.

These and other objects and advantages of the invention will become more apparent upon reference to the following specification, claims and drawings.

BEST MODE FOR CARRYING OUT THE INVENTION

In current telecommunications and data networks "In Channel" Signaling is being replaced with Common Channel Signaling (CCS) in which control signals are carried over paths completely independent of the voice channels. The common channel can be configured with the bandwidth required to carry control signals for a large variety of functions. Thus both the signaling protocol and the network architectures to support that protocol are more complex than "In Channel" signaling.

CCS provides a method for exchanging information between Stored Program Control Systems (SPCS) that are inter-connected through a network of signaling links. CCS network nodes may include but are not limited to switching systems, network databases and operator service systems. The current common protocol for CCS is Specification of Signaling System 7 (SS7) which is described in the following Bellcore (Bell Communications Research) documents. (Section 6.5, LSSGR Issue 2, Jul. 1987, TR-TSY-000506, a module of TR-TSY-000064).

Figure 8:
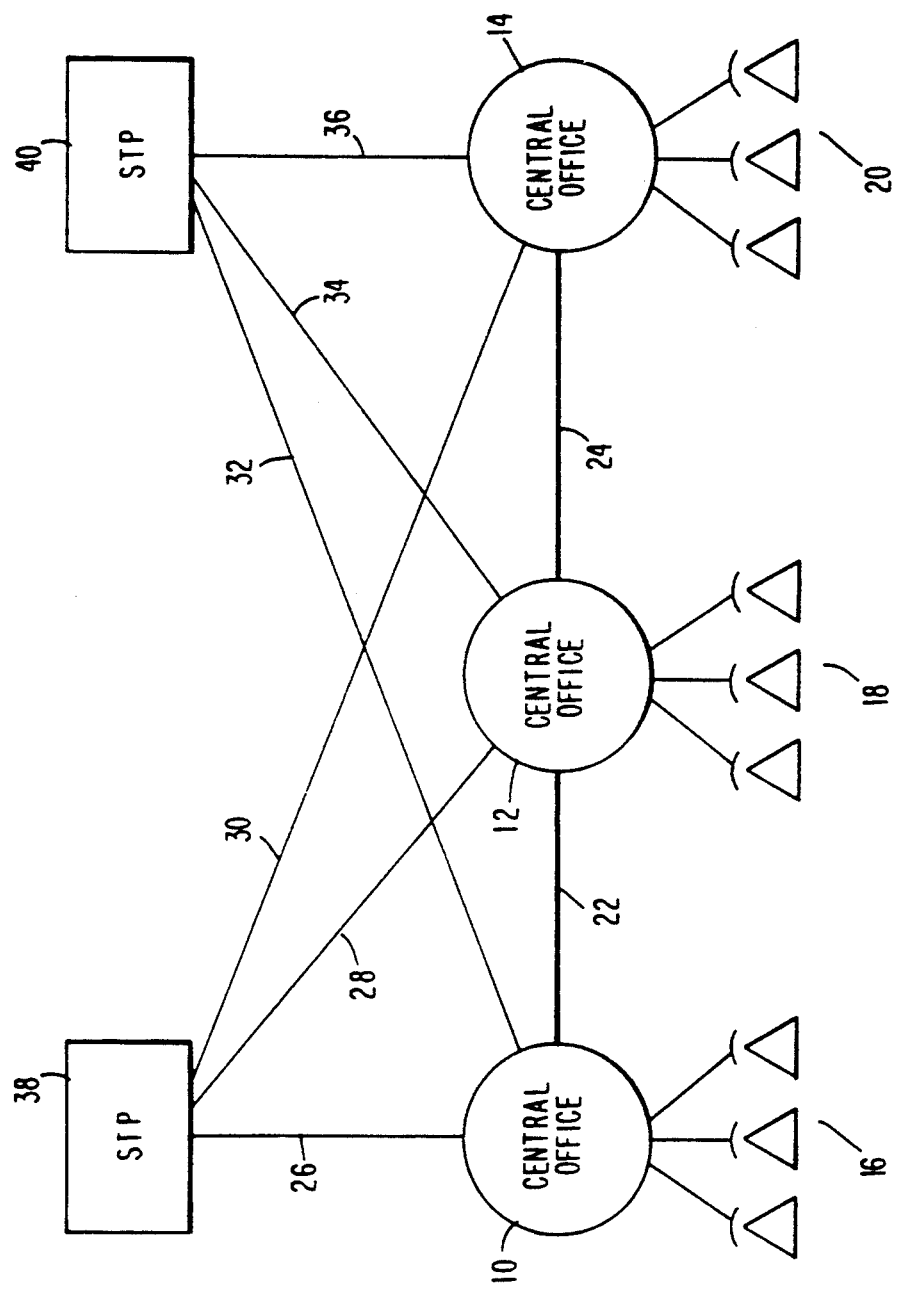
FIG. 8 constitutes a simplified illustration of the current public switched telephone network including Common Channel Signaling.

Referring to FIG. 8 there is shown a simplified diagram of an SPC telephone network linking individual subscribers through Central offices (Cos) which are connected by trunks and linked by a typical CCS network. The COs typically consist of a programmable digital switch with CCS communications capabilities such as an AT&T 5ESS or Northern Telecom DS-100 or the like and may or may not be equipped and programmed to serve as Service Switching Points (SSPs). In FIG. 8 a series of central office switches 10,, 12 and 14 are shown connected to groups of local subscribers 16, 18 and 20 by conventional local loops or subscriber lines. The COs 10, 12 and 14 are connected by trunk circuits 22 and 24, by way of example, and are also connected by one or more access tandems (not shown). Common Channel Signaling is provided by SS7 data links 26–36 extending between each CO and Signaling Transfer Points (STPS) 38 and 40. These local STPs may be connected to state or regional STPS, not shown.

A pair of STPs is conventionally provided per LATA to provide redundancy so that in the event of failure of one the other immediately assumes its load. Similarly, if one STP becomes overloaded the other shares the load to create a load balance. The paired STPs are connected by Clinks so that each STP understands what the other is doing at all times. The STPs may be configured to continually share the load or may be configured in a hot and stand-by capacity. Generally speaking, one will basically monitor the other while they share the load. If one goes down the other is immediately aware of the situation via the C-link and picks up the load to avoid an outage. Thus each of the COs 10, 12 and 14 are connected to each of the STPs 38 and 40. The STPs provide call processing data transfer between the various COs in the normal manner of SS7 common channel signaling.

Figure 1:
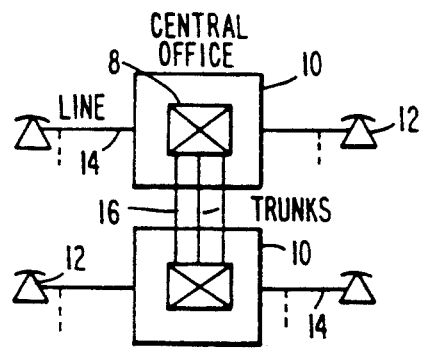
FIG. 1 constitutes a simplified illustration of the public switched telephone network as it existed prior to the Bell System divestiture.
Figure 2:
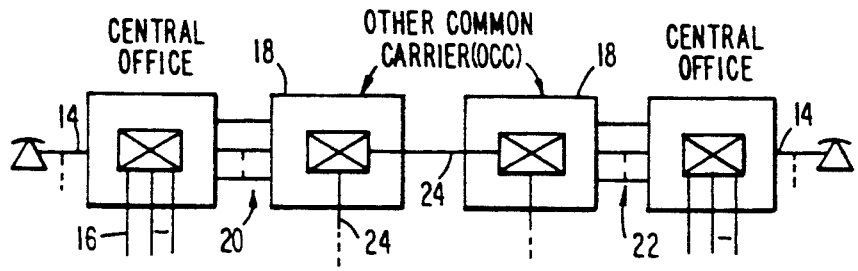
FIG. 2 constitutes a simplified illustration of the public switched telephone network as it existed prior to the Bell System divestiture and after the entry of common carriers in addition to AT&T.
Figure 3:
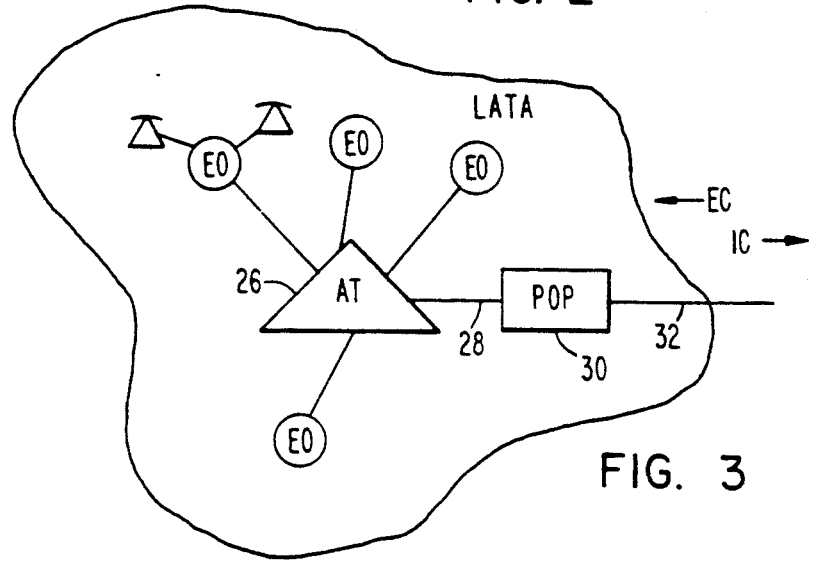
FIG. 3 constitutes a simplified illustration of a typical present day Local Access and Transport Area (LATA)
Figure 4:
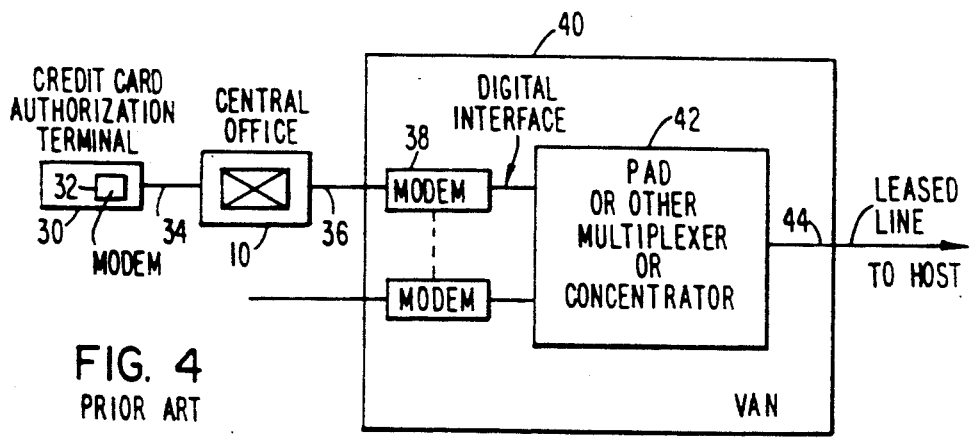
FIG. 4 constitutes a simplified illustration of a previously proposed credit card authorization arrangement.
Figure 5:
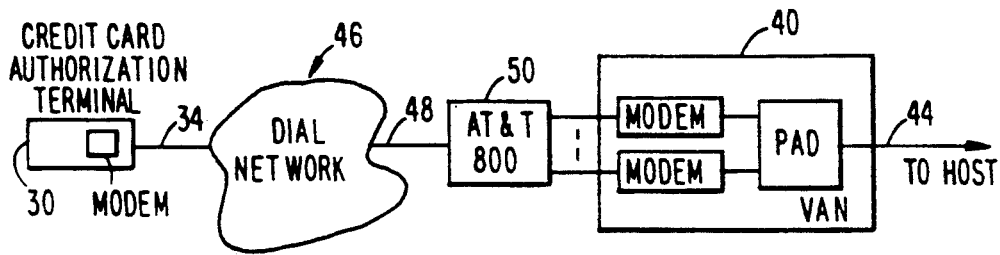
FIG. 5 constitutes a simplified illustration of another previously proposed credit card authorization arrangement.
Figure 6:
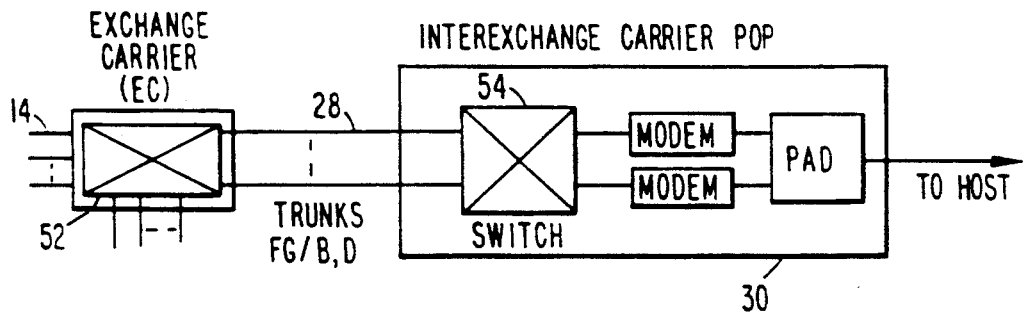
FIG. 6 constitutes a simplified illustration of a previously suggested credit card authorization arrangement.
Figure 7:
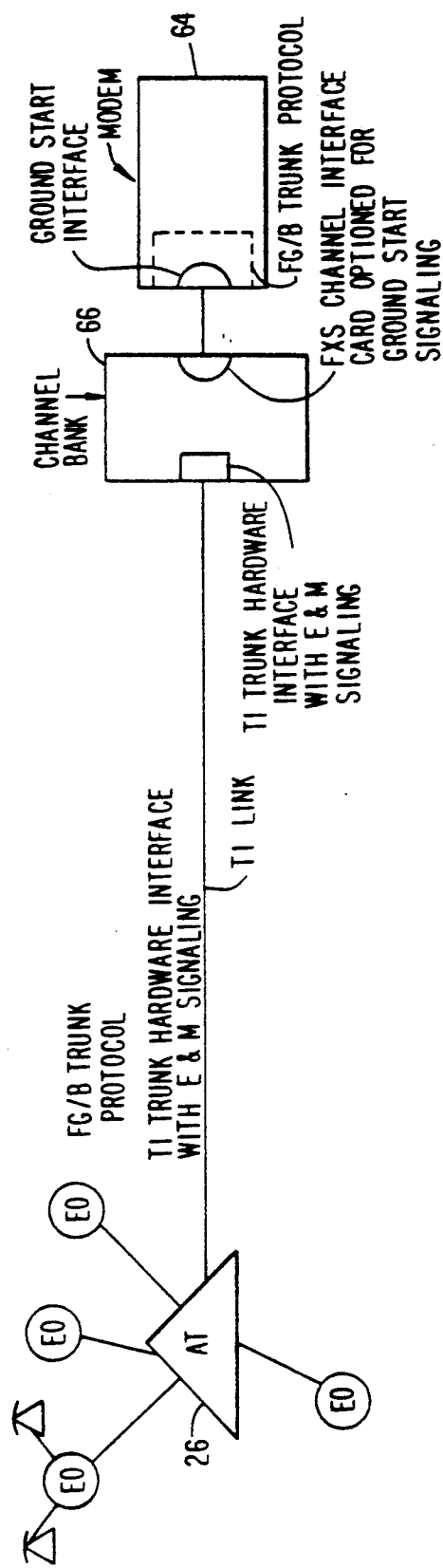
FIG. 7 constitutes a simplified illustration of another previously proposed credit card authorization arrangement.
Figure 9:
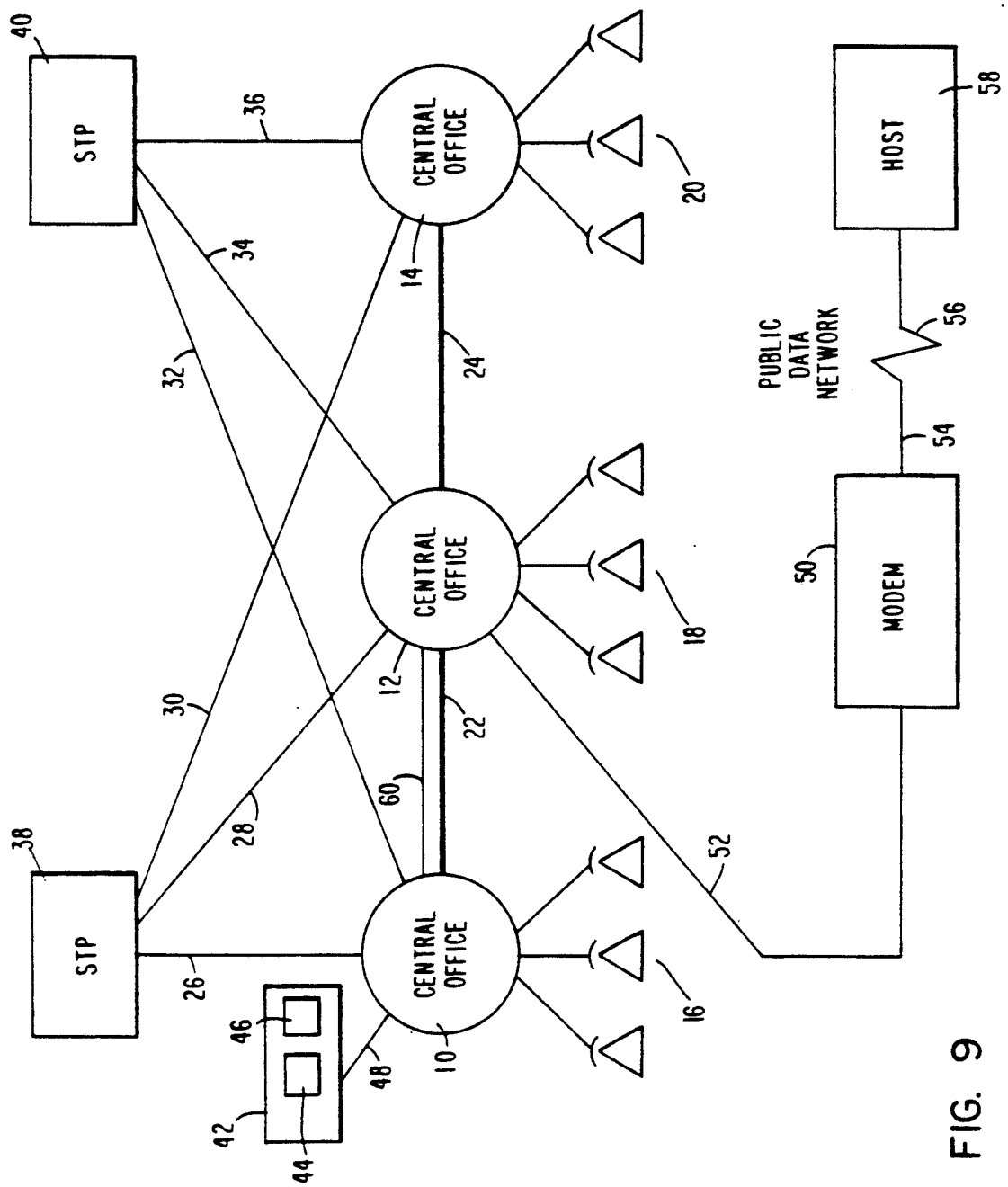
FIG. 9 constitutes a diagrammatic illustration of a business point of sale terminal device responsive system constructed according to a preferred embodiment of the invention.

Referring to FIG. 9 there is shown an arrangement of the public switched telephone network and public data network for carrying out the invention according to a preferred embodiment. In FIG. 9 there is seen a public switched telephone network as illustrated and described in connection with FIG. 7. Connected to an initiating or originating end office which is here illustrated by the central office 10, is a credit card authorization terminal 42 including the conventional modem 44 and auto-dialing device 46. The credit card authorization terminal 42 is connected by a station line 48 to the central office 10 and receives dial tone from that office.

Connected to a designated end office, which is here illustrated as central office 12, is a conventional line side modem or modem pool arrangement 50. The modem 50 exercises a line protocol and is connected to the central office 12 via a line hardware interface and line 52. The modem 50 may be conveniently located at or adjacent to the end office 12. Modem 50 is connected by an outgoing tie line 54 to a packet switch in the public data network, indicated generally at 56. Conventional X.25 packet protocol or other protocols may be used. The public data network 56 connects to a host computer 58 for effecting the credit card authorization in the conventional manner.

The originating central office 10 is connected to the terminating central office or end office 12 via Feature Group B or Feature Group D trunks which are indicated diagrammatically at 60, although it will be understood that the Feature Group trunk(.s) may be included within the trunk connection 22 between the cer offices 10 and 12. It will be appreciated that wh invention is illustrated in terms of originating central office 10 and terminating central office 12 there may be one or more central office(s) and/or tandem switch(es) between the originating central office and the terminating central office connected by Feature Group B or Feature Group D trunks executing conventional E & M trunk protocol. The originating and terminating central offices need not be in the same LATA.

The Feature Group trunk 60 interfaces with the station line 52 at the central office switch 12 through a code conversion or special digit interpretation process. Code conversion is an option in most SPC switching systems used by LECS. The software translations in the switches have the capabilities to do address digital manipulation. The switch software converts the incoming address to a different address on the line side. The end office switch has the ability to delete digits and prefix new digits that conform to the line number(s) where the modems are connected. Special digit interpretation is also an option in most SPC switching systems used by LECS. In this case, the incoming digits are "translated" via a dedicated routing table which selects a unique end office line or line hunting group. The unique end office lines are where the modems are connected.

When a bank of modems is used with a line hunt group the end office switch connects the incoming trunk to an available line circuit within the line hunt group assigned for the credit card authorization device. Each line is equipped with a modem. When ringing or quick start on the line begins, the modem is activated and aligns itself in the proper mode to receive signals from the credit card authorization device and convert them to the required digital format for forwarding to the public data network.

At this point the call to the CIC or 950-1/0XXX number is completed. Each modem is directly connected to the Packet Data Network, Public Data Network (PDN) or other data communications or data processing equipment, and the modem and PDN will respond to the signals and information generated by the credit card authorization device by passing the call information to/from the host computer. When the host and the credit card terminal are finished with exchanging information, both ends disconnect and all connections are restored to the idle state.

The operation of the system of the invention is as follows. A call is initiated from the credit card authorization terminal by the auto-dialing device dialing a CIC number or Feature Group access number such as 950-1/0XXX. The call is routed over the public switched network to the designated end office 12 using SS7 network signaling over CCS lines 26 and 28. While conventional signaling may be used CCS signaling permits a faster connection to the designated end office.

The 950-1/0XXX call comes in on the incoming Feature Group B or Feature Group D trunk 60 to the designated end office 12 to terminate on the trunk side of the designated end office switch. The Feature Group B or Feature Group D trunk is connected by the stored program control (SPC) switch at the end office 12 to the station line 52 by code converting to a directory number or using special digit interpretation and routing for the line 52. If more than one line is required to handle the demand subsequent lines may be provided in a multiple line hunt group. This directs the call from the credit authorization device 42 to a line location, namely the modem or modem bank 50, which comprises a conventional line side modem or modem bank. Instantaneous signaling to alert the modem is applied at the line by quick start, ground start or immediate ringing. This signal is speeded by the use of CCS or SS7 signaling. The modem is connected via the line 54 and public data network 56 to the host computer 58 for effecting the authentication. Once the connection is made to the host computer the exchange of information between the end user's or initiator's terminal device or credit card authorization device can begin.

The method may be summarized as comprising the steps of:

accessing the public switched telephone network from the credit card authorization device by the auto-dialing mechanism connected via a station line to an originating central office switch auto-dialing a CIC number;

routing the call over the network using SS7 network signaling or conventional network signaling and connecting the originating central office via Feature Group B or Feature Group D trunks to a terminating central office switch in the telephone network;

converting the CIC trunk call to a line side number at the terminating switch under control of the stored program of that switch and connecting via a station line to a conventional line side modem;

transmitting an output from the line side modem over the public data network via packet switching to a host computer for effecting the credit card authorization.

It is important to recognize that the end office switch functioning in the manner of the invention is a conventional end office switch which simultaneously functions to perform central office switching operations. No additional equipment is necessary and no special purpose switches or modems are required.

While the specific application discussed in the preferred embodiment has been credit card authorization it will be appreciated that other point of sale terminals may be used. Thus a car rental agency having reservation booths in hotels may provide cards which actuate point of sale terminals to signal the rental car site so that the car is ready and waiting by the time that the customer reaches the site. Cards may also be provided for ordering products which may be encoded in the cards or designated by key pad actuation.

It will be appreciated from the foregoing that the system of the invention provides an improved point of sale credit card authorization service which utilizes currently available equipment so as to provide fast, efficient and effective service in an economical manner. The service is provided within the context of the existing public switched telephone network and packet data network without requiring specially designed equipment for interfacing between such networks. Common channel signaling and immediate ringing features are preferably provided to optimize the speed of operation. Available Feature Group B or Feature Group D technology is utilized without any requirement for modem equipment having a trunk side interface.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method for providing Feature Group access to the public data network comprising a steps of:
   (a) accessing the public switched telephone network from a station connected by a station line to a first central office switch in said telephone network;
   (b) connecting said first central office via a Feature Group trunk number call on a Feature Group trunk to a second central office switch in said telephone network, said second central office being connected to other central office switches via non-Feature Group trunks and functioning to switch non-Feature Group calls in said telephone network;
   (c) converting the Feature Group trunk call at said second central office switch to a line side number;
   (d) connecting said second central office switch to a line side modem over a line identified by said line side number; and
   (e) transmitting an output of said line side modem over the public data network.

2. A method according to claim 1 wherein said first named station accesses the public switched telephone network by automatic dialing from a credit card authorization means at said station.

3. A method according to claim 2, wherein said auto-dialing comprises dialing a customer identification code (CIC) number.

4. A method according to claim 1 wherein said second central office switch comprises a stored program control (SPC) switch and said conversion of the Feature Group trunk call to a line side number is effected under control of said stored program.

5. A method according to claim 1 including the step of transmitting said output of said line side modem over the public data network via packet switching to a host computer.

6. A method according to claim 4 including the step of accessing the public switched telephone network from said first named station by automatic dialing from a credit card authorization means; and
   transmitting an output of said line side modem over the public data network via packet switching to a host computer means for effecting said credit card authorization.

7. A method for providing Feature Group access to the public data network comprising the steps of:
   (a) accessing the public switched telephone network from a station including a credit card authorization means including auto-dialing means connected by a station line to a first central office switch in said telephone network by auto-dialing a customer identification code (CIC) number;
   (b) connecting said first central office via a Feature Group B or Feature Group D trunk to a second central office switch in said telephone network, said second central office switch being a stored program control (SPC) switch connected to other central office switches via non-Feature Group trunks and functioning to switch non-Feature Group calls in said telephone network;
   (c) converting the CIC call to a line side number at said SPC switch under control of the stored program of said switch;
   (d) connecting the line identified by said line side number to a line side modem;
   (e) transmitting an output of said line side modem over the public data network via packet switching to a host computer means for effecting said credit card authorization.

8. A method according to claim 7 wherein said CIC number is a 950-1/0XXX number.

9. A method according to claim 7 wherein said first central office is in a different local access and transport areas (LATA) than said second central office.

10. A system for connecting selected calling stations to a predetermined destination over the public switched telephone network, said network including Stored Program Control (SPC) switching means connected by trunks and trunk switching means, said SPC switching means being connected to stations by station lines, said predetermined destination comprising a station connected to one of said SPC switching means by station lines, said destination station comprising line side modem means connected to said station lines, said modem means being connected by digital communication link means to host computer means, said one SPC switching means being connected to Feature Group trunk means in said telephone network, said Feature Group trunk means being connected through said network to said selected calling stations by said selected stations dialing a customer identification code (CIC) number, said one SPC switching means being programmed to connect said CIC number received over said Feature Group trunk means to a line side number for said destination station, and means at said one SPC switching means for initiating a quick start signal to said modem means immediately upon said one SPC switching means seizing a circuit in said Feature Group trunk means on which said CIC call is incoming.

11. A system according to claim 10 wherein said digital communication link means comprises a public data network.

12. A system according to claim 11 wherein said CIC number comprises a 950-1/0XXX number.

13. A system according to claim 10 wherein said Feature Group trunks are Feature Group B or Feature Group D trunks.

14. A system according to claim 10 wherein said network includes a Common Channel Signalling (CCS) network and said circuit seizure occurs in response to a CCS signal.

15. A system according to claim 14 wherein said CCS signal is signalling system 7 (SS7).

16. A system according to claim 10 wherein said quick start signal is ground start or immediate ring signalling.

17. A system according to claim 10 wherein said selected calling stations comprise credit card authorization means connected to station line means through modem means.

18. A system for connecting selected calling stations to a predetermined destination over a public switched telephone network, said selected calling stations including credit card authorization means, said network including multiple Stored Program Control (SPC) switching means connected by trunks and trunk switching means, said SPC switching means being also connected by Common Channel Signalling (CCS) links, said SPC switching means being connected to stations by station lines, said predetermined destination comprising a station connected to one of said SPC switching means by station lines, said destination station comprising line side modem means connected to said station lines, said modem means being connected by digital communication link means to host computer means, said one SPC switching means being connected to Feature Group B or Feature Group D trunk means in said telephone network, said Feature Group trunk means being connected through said network to said selected calling stations by said selected station dialing a customer identification code (CIC) number, said one SPC switching means being programmed to convert said CIC number received over said Feature Group B or Feature Group D trunk means to a line number for said destination station, and means at said one SPC switching means for initiating a quick start signal to said modem means immediately upon said one SPC switching means receiving a CCS signal requesting said CIC connection and establishing a connection.

19. A system according to claim 18 wherein said CIC number is a 950-1/0XXX number.

20. A system according to claim 18 wherein said digital communication link means comprises a public data network.

21. In a public switched communications network including Stored Program Control (SPC) switch means connected together by trunk means wherein said SPC switch means are connected to stations by station lines, the method of providing special purpose communications comprising:

(a) providing at selected stations connected to said SPC switch means point of sale terminal devices including modem means and automatic dialing means;

(b) providing at a destination station connected to one of said SPC switch means by station lines, line side modem means connected to said station line, said modem means being connected to host computer means via a digital communication link;

(c) providing, between the SPC switch means connected to said selected stations and the SPC switch means connected to said destination station, Feature Group trunk means;

(d) providing a customer identification code (CIC) number which when dialed by said automatic dialing means effects connection of the terminal device to the SPC switch means connected to said destination station;

(e) effecting in said last named SPC switch means a number conversion from said CIC number to a number assigned to said destination station; and (f) Sending from said last named SPC switch means to said destination station a quick start signal to effect initialization of said line side modem means.

22. A method according to claim 21 wherein said CIC number is a 950-1/0XXX number.

23. A method according to claim 22 wherein said digital communication link comprises a public data network.

* * * * *